United States Patent [19]

Shtarkman et al.

[11] Patent Number: 5,257,681

[45] Date of Patent: Nov. 2, 1993

[54] APPARATUS FOR DAMPING MOVEMENT

[75] Inventors: Emil M. Shtarkman, Southfield; James L. Graves, Royal Oak, both of Mich.

[73] Assignee: TRW Inc., Lyndhurst, Ohio

[21] Appl. No.: 951,858

[22] Filed: Sep. 28, 1992

[51] Int. Cl.$^5$ ............................................. F16F 6/00
[52] U.S. Cl. .................................... 188/267; 188/130; 188/290; 188/306; 192/21.5; 267/140.15
[58] Field of Search ........ 188/267, 130, 290, 306–310, 188/266, 268, 322.5, 291–296; 267/140.15, 140.14; 248/550; 192/21.5; 280/112.2, 707, 90, 272

[56] References Cited

U.S. PATENT DOCUMENTS

| | | | |
|---|---|---|---|
| 2,629,471 | 2/1953 | Rabinow | 192/21.5 |
| 2,695,675 | 11/1954 | Frye | 188/267 X |
| 2,743,800 | 5/1956 | Levinson et al. | 192/21.5 |
| 2,745,527 | 5/1956 | Winther | 192/21.5 |
| 2,748,911 | 6/1956 | Stahl | 192/21.5 |
| 2,832,449 | 4/1958 | Winther | 192/21.5 |
| 2,948,371 | 8/1960 | Lehde | 192/21.5 X |
| 3,208,567 | 9/1965 | Metzger | 192/21.5 X |
| 4,844,220 | 7/1989 | Maji et al. | 188/267 |
| 4,896,754 | 1/1990 | Carlson et al. | 188/267 X |
| 4,942,947 | 7/1990 | Shtarkman . | |
| 5,054,593 | 10/1991 | Carlson | 192/21.5 |

FOREIGN PATENT DOCUMENTS

56801 5/1947 France ............................ 192/21.5

Primary Examiner—Douglas C. Butler
Attorney, Agent, or Firm—Tarolli, Sundheim & Covell

[57] ABSTRACT

An apparatus for damping movement includes a housing and a blade which are movable relative to each other. The blade is cantilevered to an axis and has segments formed of magnetizable material which are separated by segments formed of nonmagnetizable material. Electromagnetic coils are connected with the housing and apply a magnetic field to a magnetic field responsive fluid through which the blade is movable. The blade has recesses which are formed in the segments of magnetizable material and hold magnetic field responsive fluid. A plurality of ribs separate the recesses and are at least partially formed of the nonmagnetizable material. In one embodiment of the invention, ribs and recesses are provided on opposite sides of the blade. In another embodiment of the invention, the ribs and recesses are provided on one side of the blade and the opposite side of the blade is flat. A side surface which is connected with the housing may have ribs and recesses which are aligned with the ribs and recesses in the blade.

19 Claims, 5 Drawing Sheets

APPARATUS FOR DAMPING MOVEMENT

BACKGROUND OF THE INVENTION

The present invention relates to an apparatus for damping movement between relatively movable parts and may be used in a rotary shock absorber connected with an automotive vehicle suspension system.

A known apparatus for damping relative movement is disclosed in U.S. Pat. No. 4,942,947 issued Jul. 24, 1990 and entitled "Rotary Shock Absorber with a Controlled Damping Rate". The apparatus disclosed in this patent includes a shock absorber for a wheel suspension of an automotive vehicle. The shock absorber has a housing which is connected with the frame of a vehicle. A blade connected with a wheel suspension motion control arm is disposed in a chamber in the housing. The chamber is filled with a field-responsive fluid. When the strength of the field provided by electromagnets connected with the housing is increased, shear strength of the fluid increases to increase resistance to movement of the blade relative to the housing.

During use of the rotary shock absorber disclosed in the aforementioned U.S. Pat. No. 4,942,947, movement of the blade relative to the housing may cause wear of the blade and/or surfaces of the housing. The tendency for the blade and/or surfaces connected with the housing to wear increases if the blade is deflected by the electromagnetic field acting thereon into engagement with the housing while the vehicle is encountering uneven road conditions. It has been determined that excessive wear of the blade and/or surfaces connected with the housing tends to be detrimental to the performance of the rotary shock absorber.

SUMMARY OF THE INVENTION

The present invention provides a new and improved apparatus for damping movement between relatively movable parts. The apparatus includes a housing having a chamber for holding magnetic field responsive fluid. A cantilevered, pivotal blade is disposed in the chamber of the housing and movable relative to the housing. An electromagnetic coil is provided to apply a magnetic field to the magnetic field responsive fluid in the chamber to vary the shear strength of the fluid in the chamber and thereby vary the resistance to relative movement between the blade and the housing.

In accordance with one of the features of the invention, the blade and/or housing have surfaces with a plurality of recesses which hold magnetic field responsive fluid. A plurality of projections separate the recesses.

In one embodiment of the invention, the recesses are disposed at segments of the blade formed of magnetizable material. The projections are disposed at segments of the blade formed of nonmagnetizable material. Sideways or lateral deflection of the blade relative to the housing can result in engagement of the projections formed of nonmagnetizable material with a surface connected with the housing while maintaining at least major portions of the magnetizable material of the blade spaced from the surface connected with the housing. A plurality of recesses separated by projections may also be formed in the surface connected with the housing.

BRIEF DESCRIPTION OF THE DRAWINGS

Further features of the present invention will become more apparent to those skilled in the art to which the present invention relates from reading the following specification with reference to the accompanying drawings, wherein.

DESCRIPTION OF PREFERRED EMBODIMENTS

Figure 1:
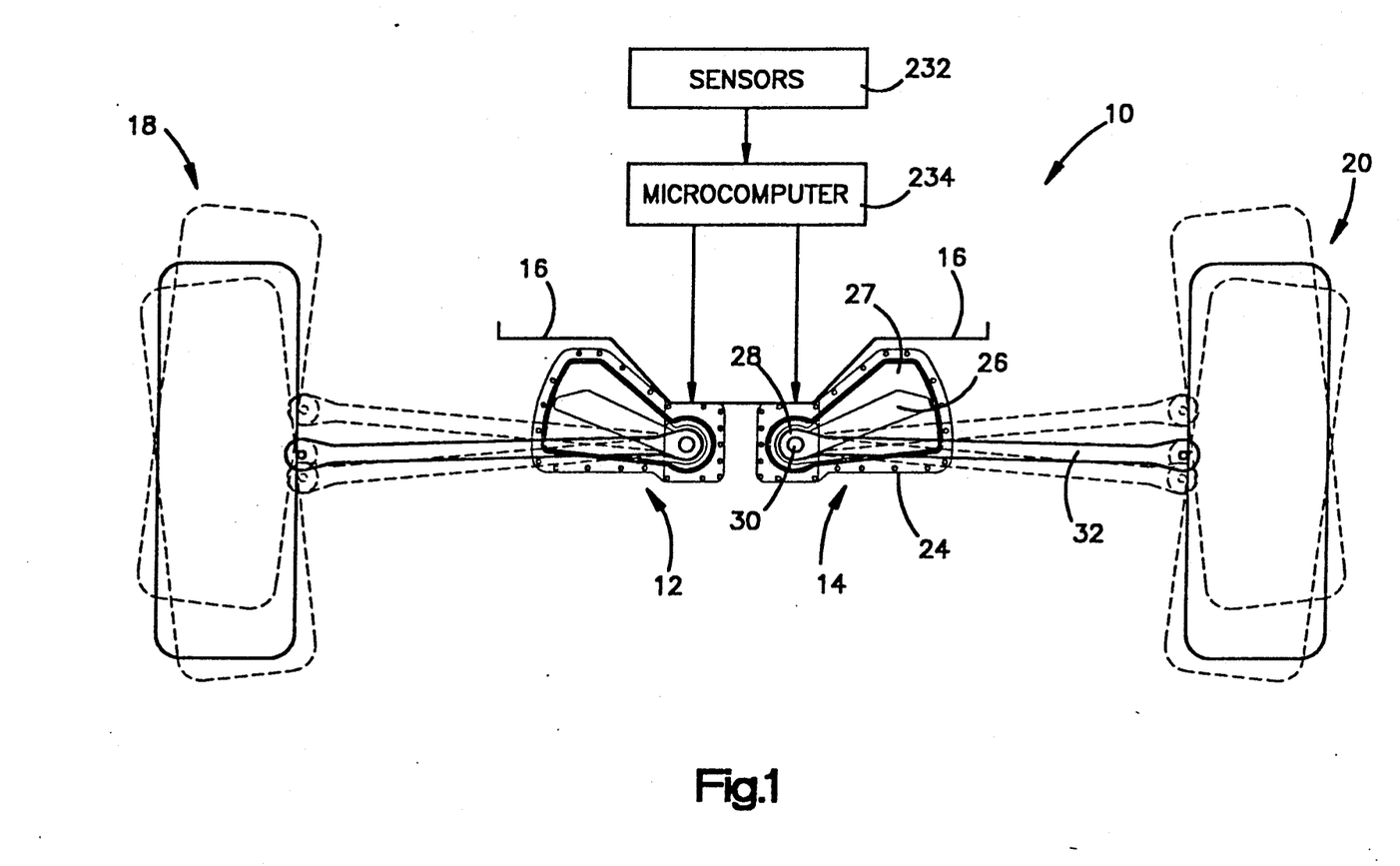
FIG. 1 is a schematic and partially broken away diagram of a part of a vehicle suspension system incorporating a rotary shock absorber constructed in accordance with the present invention.

Although an apparatus constructed and operated in accordance with the present invention could be used in many different environments, an automotive vehicle suspension system 10 (FIG. 1) includes a pair of rotary shock absorbers 12 and 14 constructed in accordance with the present invention. The rotary shock absorbers 12 and 14 dampen relative movement between a frame 16 of the vehicle and a pair of wheel assemblies 18 and 20. The rotary shock absorbers 12 and 14 may be mirror images of each other but have the same construction.

Figure 3:
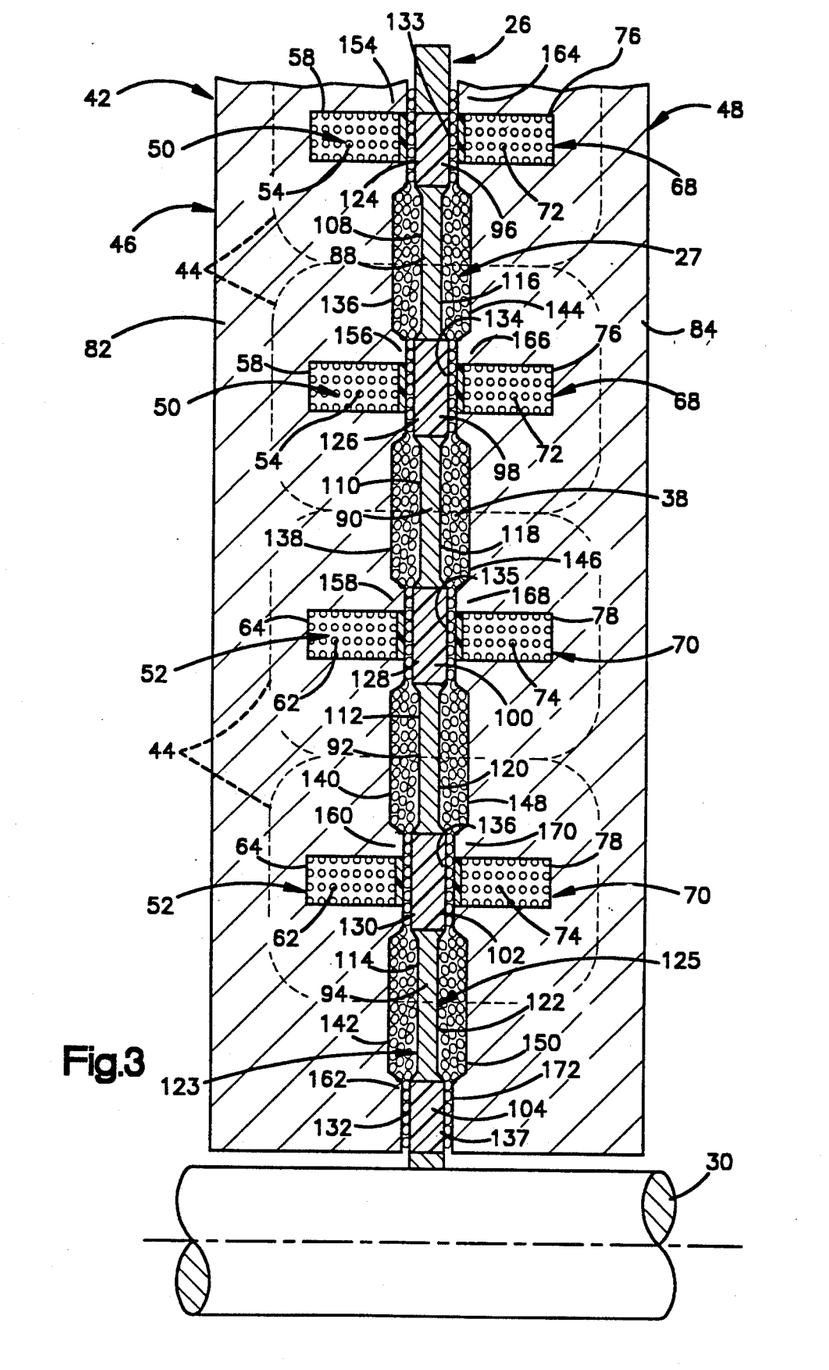
FIG. 3 is a schematicized sectional view, taken generally along the line 3—3 of FIG. 2.

The rotary shock absorber 14 includes a housing 24 which is fixedly connected with the frame 16 of the vehicle. A blade 26 is disposed in a chamber 27 in the housing 24. An inner end portion 28 of the blade 26 is connected to a shaft 30. The shaft 30 is fixedly connected to and extends perpendicular to the longitudinal central axis of a suspension control arm 32. The suspension arm 32 is connected with the wheel assembly 20. The chamber 27 is filled with fluid 38 responsive to magnetic field (FIG. 3). The construction and operation of the rotary shock absorber 14 is generally the same as disclosed in the aforementioned U.S. Pat. No. 4,942,947.

The housing 24 includes an electromagnet assembly 42 (FIG. 3) that is operable to apply a magnetic field, indicated schematically at 44 in FIG. 3, to the fluid 38 in the chamber 27. Increasing the strength of a magnetic field which is provided by the electromagnet assembly 42 and to which the fluid 38 is exposed, increases the shear strength of the ferro-magnetic fluid. Conversely, decreasing the strength of the magnetic field 44 to which the fluid 38 is exposed, decreases the shear strength of the fluid. Although many different known fluids 38 responsive to a magnetic fluid could be utilized, it is currently preferred to use the fluid disclosed in U.S. patent application Ser. No. 814,245 filed Dec. 23, 1991 by Emil M. Shtarkman for "Fluid Responsive to a Magnetic Field".

Figure 2:
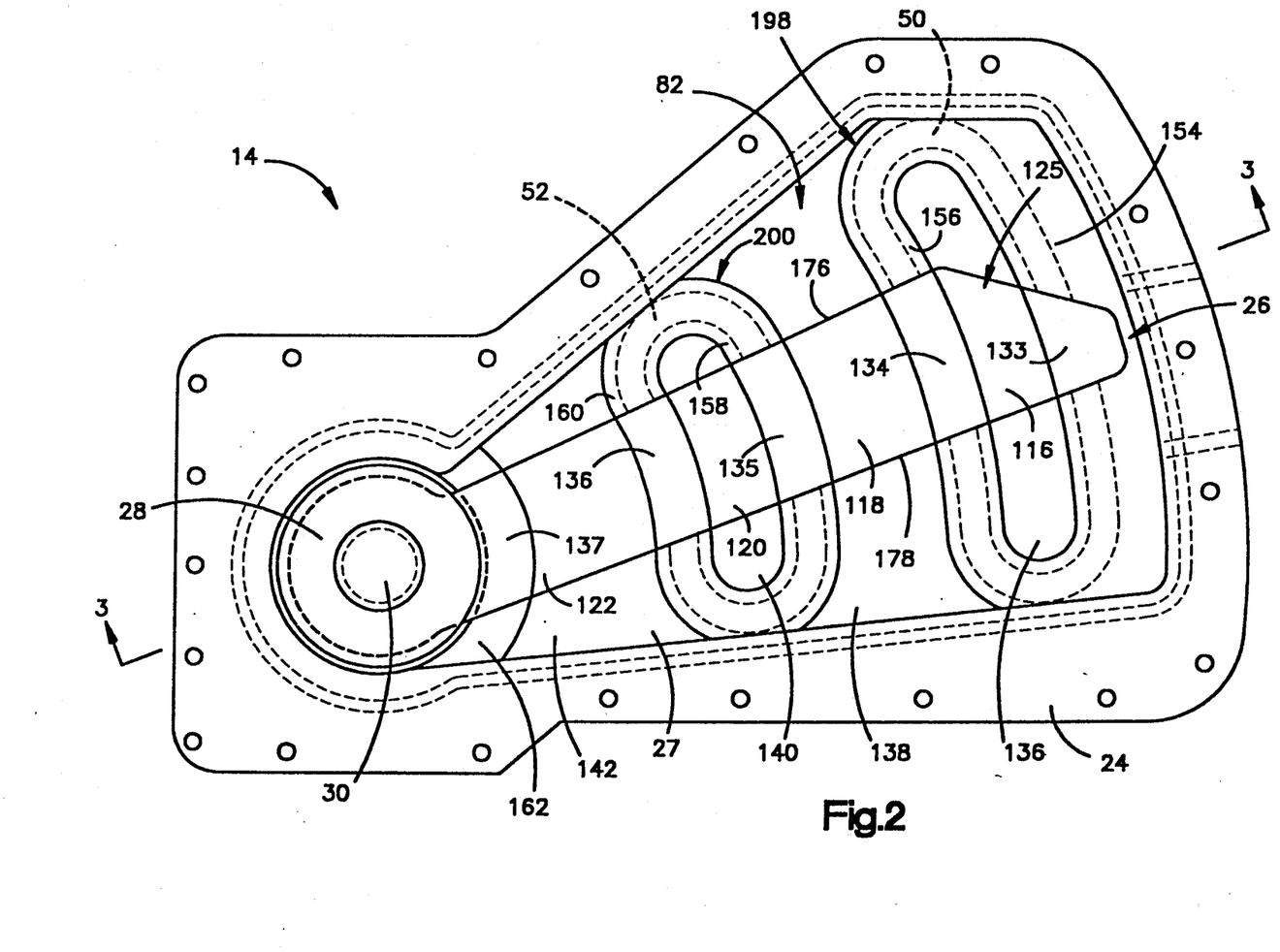
FIG. 2 is an enlarged view of a portion of the rotary shock absorber of FIG. 1.

The electromagnet assembly 42 includes a pair of electromagnet sections 46 and 48 (FIG. 3). The electromagnet sections 46 and 48 form part of the housing 24 and are disposed on opposite sides of the blade 26. The electromagnet section 46 includes two coils 50 and 52 (FIGS. 2 and 3). The coil 50 is formed by a conductor 54 which extends in a continuous loop, indicated in dashed lines in FIG. 2. The conductor 54 is disposed in a chamber 58 having a rectangular cross sectional configuration (FIG. 3). The conductor 54 is encased in a suitable polymeric potting compound held in the chamber 58. An opening at the end portion of the chamber 58 toward the blade 26 is completely closed and sealed by the potting compound.

The coil 52, like the coil 50, forms a continuous loop (FIG. 2) and is made up of conductor 62 disposed in a chamber 64. The chamber 64, like the chamber 58, is filled with and sealed by a suitable polymeric potting compound. Although the chambers 58 and 64 have only been shown in cross section in FIG. 3, it should be understood that the chambers 58 and 64 have a continuous loop shaped configuration corresponding to the loop shaped configuration of the coils 50 and 52 (FIG. 2).

The electromagnet section 48 (FIG. 3) has the same construction as the electromagnet section 46. Thus, the electromagnet section 48 includes two coils 68 and 70 having the same construction and configuration as the coils 50 and 52. The coils 68 and 70 include conductors 72 and 74 which form a pair of continuous loops in the same manner as do the conductors 54 and 62. The conductors 72 and 74 are disposed in chambers 76 and 78.

When the coils 50, 52, 68 and 70 are electrically energized, a magnetic circuit is established and magnetic flux is conducted between pole pieces 82 and 84 in which the coils 50, 52, 68 and 70 are disposed. The pole pieces 82 and 84 are formed of a pure soft magnetic iron or a ferro-magnetic alloy. When electrical current conducted through the coils 50, 52, 68 and 70 is increased, the density of the flux conducted between the pole pieces 82 and 84 is increased. Increasing the density of the flux conducted between the pole pieces 82 and 84 increases the strength of the magnetic field to which the fluid 38 in the chamber 27 is exposed.

Although the blade 26 may be formed from a single piece of material, in the illustrated embodiment of the invention, the blade 26 has a composite construction. Thus, the blade 26 includes a plurality of segments 88, 90, 92, and 94 (FIG. 3) which are formed of a magnetizable material. The segments 88-94 may be formed of pure soft magnetic iron or ferro-magnetic alloys. The segments 88-94 of magnetizable material are separated by segments 96, 98, 100, 102, and 104 which are formed of a nonmagnetizable material. The segments 96-104 may be formed of plastic, aluminum, brass, or nonmagnetic stainless steel. The segments 96-104 of nonmagnetizable material cooperate with the segments 88-94 of magnetizable material to optimize the circuit created by a magnetic field to which the blade 26 is exposed.

In accordance with a feature of the present invention, a plurality of shallow recesses 108, 110, 112, 114, 116, 118, 120, and 122 (FIG. 3) are formed in opposite sides 123 and 125 of the blade 26. In addition, a plurality of projections or ribs 124, 126, 128, 130, 132 are formed in the side 123 of the blade 26 and separate the recesses 108, 110, 112, and 114. A plurality of projections or ribs 133, 134, 135, 136 and 137 are formed in the side 125 of the blade 26 and separate the recesses 116, 118, 120, and 122. The projections 124, 126, 128, 130 and 132 and recesses 108, 110, 112 and 114 formed in the side 123 of the blade 26 are aligned with the projections 133, 134, 135, 136 and 137 and recesses 116, 118, 120 and 122 in the side 125 of the blade.

In accordance with another feature of the invention, recesses 136, 138, 140, 142, 144, 146, 148, and 150 (FIG. 3) are formed in the pole pieces 82 and 84. In addition, projections or ribs 154, 156, 158, 160, and 162 are formed in the pole piece 82 and ribs or projections 164, 166, 168, 170, and 172 are formed in the pole piece 84.

The ribs or projections 154-172 in the pole pieces 82 and 84 separate the recesses 136-150 formed in the pole pieces. The ribs and recesses in the blade 26 and the ribs and recesses in the pole pieces 82 and 84 and are aligned with each other.

The recesses 108-122 on opposite sides 123 and 125 of the blade 26 has opposite edge portions 176 and 178 (FIG. 2). Although only the recesses 116, 118, 120 and 122 on one side 125 of the blade 26 have been shown in FIG. 2, it should be understood that the recesses 108, 110, 112 and 114 on the opposite side 123 of the blade have the same configuration as the recesses 116, 118, 120 and 122 and also extend between the edge portions 176 and 178 of the blade.

The ribs or projections 133, 134, 135, 136 and 137 on the side 125 of the blade 26 extend between opposite edge portions 176 and 178 of the blade. One end of each of the ribs 133-137 is disposed in the edge portion 176 of the blade 26. The opposite end of each of the ribs 133-137 is disposed in the edge portion 178 of the blade 26. Although only the ribs 133-137 on the side 125 of the blade 26 have been shown in FIG. 2, it should be understood that the ribs 124, 126, 128, 130 and 132 on the Opposite side 123 of the blade have the same configuration as the ribs 133-137 and also extend between the edge portions 176 and 178 of the blade.

When the blade 26 is being rotated in a counterclockwise direction (as viewed in FIG. 2) relative to the housing 24 about the central axis of the shaft 30, the edge portion 176 is leading and the edge portion 178 is trailing. However, when the blade 26 is being rotated in a clockwise direction relative to the housing 24 about the central axis of the shaft 30, the edge portion 178 of the blade is leading and the edge portion 176 of the blade is trailing.

The projections or ribs 124-137 formed on the blade 26 have an arcuate configuration (FIG. 2). A center of curvature of each rib 124-137 is on the central axis of the shaft 30. This results in the recesses 108-122 in the blade 26 having arcuate edge portions which extend transversely to the opposite edge portions 176 and 178 of the blade.

The recess 110 (FIG. 4) in the blade 26 has a flat bottom surface 186 which faces toward and is aligned with the recess 138 in the pole piece 82. A flat bottom surface 186 of the recess 110 extends lengthways between the opposite edge portions 176 and 178 (FIG. 2) of the blade 26. The recess 110 has side surfaces 188 and 190 (FIG. 4) which slope outwardly from the central axis of the blade 26 to the ribs 126 and 128. The sloping side surfaces 188 and 190 extend between the opposite edge portions 176 and 178 of the blade 26. Therefore, the recess 110 has open ends at the opposite edge portions 176 and 178 (FIG. 2) of the blade as well as a main opening which faces toward the pole piece 82.

The ribs 126 and 128 (FIG. 4) have flat side surfaces 194 and 196. The flat side surfaces 194 and 196 extend lengthways between the opposite edge portions 176 and 178 (FIG. 2) of the blade 26. The flat side surfaces 194 and 196 are disposed opposite to the ribs or projections 156 and 158 disposed pole piece 82. The flat side surfaces 194 and 196 are disposed in a plane which extends parallel to a plane containing the bottom surface 186 of the recess 110 and to the central axis of the blade 26.

Figure 4:
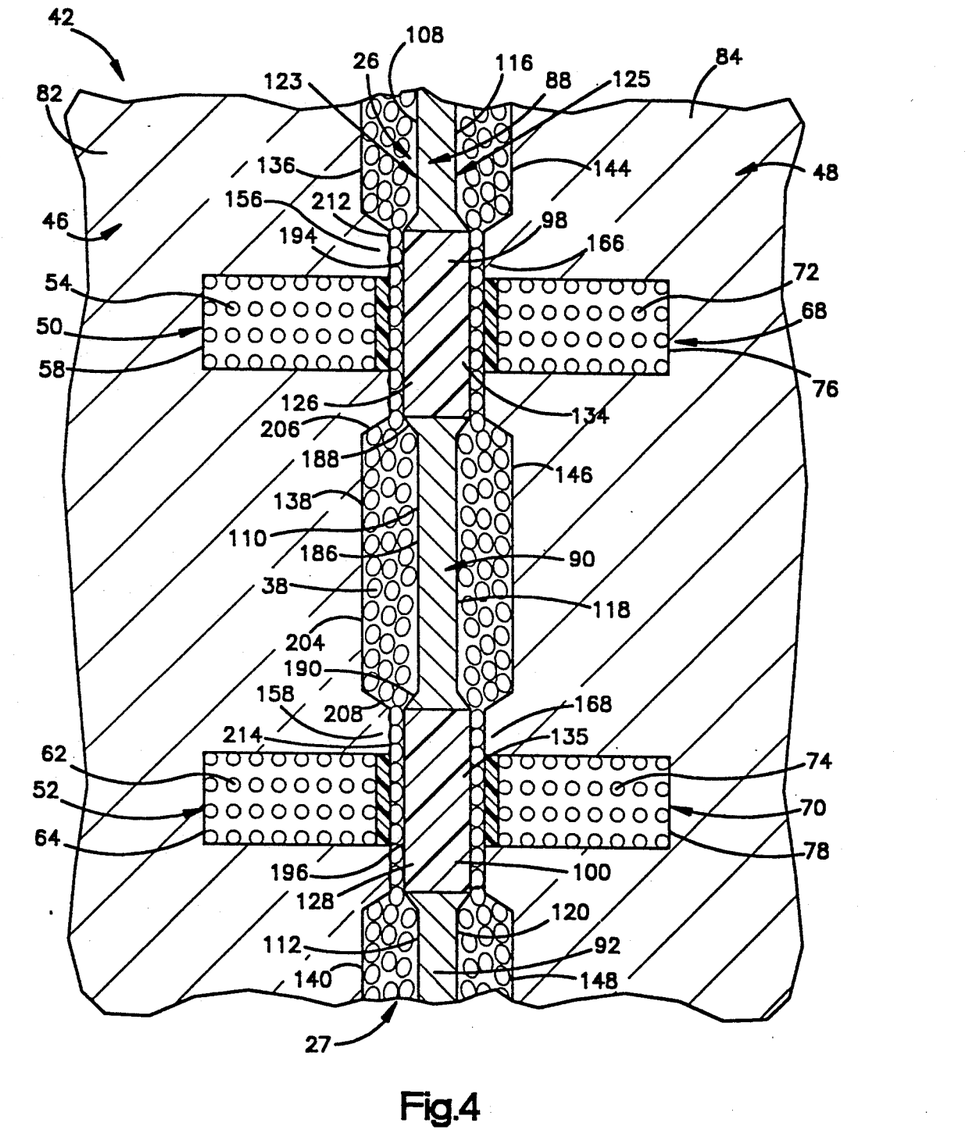
FIG. 4 is an enlarged fragmentary view of a portion of FIG. 3.

The depth of the recess 110 is measured perpendicular to parallel planes containing the surfaces 194 and 196 on the ribs 126 and 128 and the bottom surface 186 of the recess 110. To be effective, the depth of the recess 110 is at the least 0.005 inches and at the most 0.050 inches. The depth of the recess 110 is the same throughout the length of the recess. It is presently preferred to have the depth of the recess 110 be approximately 0.020 inches.

Although the foregoing description dealt only with the recess 110 of the blade 26, it should be understood that the recesses 108, 112, 114, 116, 118, 120, and 122 all have the same cross sectional configuration as the recess 110 and extend between opposite edge portions 176 and 178 of the blade 26. The recesses 108-122 are all of the same uniform depth, that is, between 0.005 inches and 0.050 inches.

The recesses 108, 110, 112, and 114 in the left (as viewed in FIG. 3) side of the blade 26 are aligned with the recesses 116, 118, 120 and 122 in the opposite or right side of the blade. The bottom surfaces of the recesses 116-122 in the right (as viewed in FIG. 3) side of the blade 26 are all disposed in a plane which extends parallel to a plane containing the bottom surfaces of the recesses 108-114 in the left (as viewed in FIG. 3) side of the blade. The bottom surfaces of the recesses 116-122 extend between opposite edge portions 176 and 178 of the blade 26. The recesses 136, 138, 140, 142, 144, 146, 148, and 150 in the pole pieces 82 and 84 have the same cross sectional configuration as the recesses 108-122 (FIG. 3) formed in the blade 26 and are aligned with the recesses in the blade.

The ribs 154, 156, 158, and 160 formed in the pole piece 82 (FIGS. 2 and 3) are interconnected in a pair of generally oval loops 198 and 200 (FIG. 2). The oval loops 198 and 200 have the same general configuration as the oval loops in which the coils 50 and 52 are disposed. Thus, the rib 154 forms the right (as viewed in FIG. 2) portion of an oval loop 198 while the rib 156 forms the left (as viewed in FIG. 2) portion of the oval loop. The oval loop 198 is aligned with the coil 50.

Similarly, the rib 158 forms the right portion (as viewed in FIG. 2) of the oval loop 200. The rib 160 forms a left portion (as viewed in FIG. 2) of the oval loop. The oval loop 200 is aligned with the coil 52.

The recesses 136, 138, 140 and 142 formed in the pole piece 82 have the same cross sectional configuration as the recesses 108, 110, 112 and 114 (FIG. 3) formed in the blade 26. However, the recess 136 in the pole piece 82 is disposed inside of the oval loop 198 (FIG. 2) containing the ribs 154 and 156. Similarly, the recess 140 in the pole piece 82 is disposed inside of the oval loop 200 containing the ribs 158 and 160. The recesses 138 and 142 are disposed outside of the oval loops 198 and 200.

The recess 138 in the pole piece 82 (FIG. 4) has a flat bottom surface 204 which is disposed in a plane extending parallel to a plane containing the flat bottom surface 186 of the recess 110 in the blade 26. A pair of sloping side surfaces 206 and 208 connect the flat bottom surface 204 of the recess 138 with the ribs 156 and 158 of the pole piece 82.

The ribs 156 and 158 on the pole piece 82 have flat side surfaces 212 and 214 which extend parallel to the flat bottom surface 204 of the recess 138. The flat side surfaces 212 and 214 of the ribs 156 and 158 are disposed in a plane which extends parallel to the plane containing the flat side surfaces 194 and 196 of the ribs 126 and 128 on the blade 26. The recess 138 has a uniform depth throughout the extent of the flat bottom surface 204. The depth of the recess 138 is the distance between parallel planes containing the bottom surface 204 of the recess 138 and the outer side surfaces 212 and 214 of the ribs 156 and 158. The depth of the recess 138 is at least 0.005 inches and at most 0.050 inches. At the present time, it is preferred to form the recess 138 with a depth of approximately 0.020 inches.

It should be understood that the recesses 136, 140 and 142 in the pole piece 82 have the same cross sectional configuration (FIG. 3) as the recess 138. The recesses 136, 140 and 142 have the same uniform depth as the recess 138. The flat bottom surfaces of the recesses 136-142 are all disposed in the same plane. However, the overall configuration of each of the recesses 136-142 are different due to their different positions relative to the oval loops 198 and 200 (FIG. 2).

The pole piece 84 has recesses 144, 146, 148 and 150 (FIG. 3) with the same cross sectional configuration as the recesses 116, 118, 120 and 122 in the blade 26 and as the recesses 136, 138, 140 and 142 in the pole piece 82. The ribs 164, 166, 168, 170 and 172 formed in the pole piece 84 have the same configuration as the corresponding ribs formed in the pole piece 82. Thus, the ribs 164 and 166 in the pole piece 84 form part of an oval loop in the same manner as in which the ribs 154 and 156 form part of the oval loop 198 (FIG. 2). Similarly, the ribs 168 and 170 in the pole piece 84 form a portion of an oval loop in the same manner as in which the ribs 158 and 160 is part of the oval loop 200. The uniform depth of the recesses 144-150 formed in the pole piece 84 is the same as the depth of the recesses formed in the pole piece 82.

When the wheel assembly 20 (FIG. 1) encounters a defect, for example, a chuckhole in a road surface, the wheel assembly moves downwardly. As this occurs, sensors 232 provide signals to a microcomputer 234. The sensors 232 provide output signals which may be indicative of road conditions, such as a chuckhole or a rock in the road, etc. These output signals may also include indications of vehicle acceleration, vehicle speed, or brake system pressure.

The microcomputer 234 monitors the output signals from the remote sensors 232 and generates control output signals in accordance with preprogrammed procedures stored in an internal memory of the microcomputer 234. Microcomputers similar to the microcomputer 234 are readily available in the commercial market. Their internal structure and operation are well known in the art and, therefore, will not be described in detail herein.

In response to the output signals from the remote sensors 232, the microcomputer 234 generates control output signals to control voltages applied to the coils 50, 52, 68 and 70 (FIG. 3) associated with the electromagnet sections 46 and 48. As already mentioned hereinabove, the damping rate of the shock absorber 14 varies as a function of the voltages applied to the coils 50, 52, 68 and 70.

When the vehicle encounters an uneven road surface, the blade 26 may tend to deflect sideways relative to the electromagnet sections 46 and 48. Any tendency for the blade 26 to deflect is enhanced by the magnetic field 44 which magnetically attracts the segments 88, 90, 92 and 94 of the blade toward the pole pieces 82 and 84. This may result in one or more of the ribs 124-137 on the blade 26 moving toward one of the pole pieces 82 or 84 and engaging a corresponding rib on the pole piece. By magnetically attracting the segments 88-94 toward a pole piece 82 or 84, the magnetic field 44 promotes engagement of one or more of the ribs 124-137 on the blade 26 with one or more of the ribs on a pole piece 82 or 84. The ribs 124–137 on the blade 126 are primarily formed by the segments 96–104 of nonmagnetizable material. The segments 96–104 have a relatively low coefficient of friction so that relatively little wear occurs when one of the ribs 124–137 on the blade 26 engages one of the ribs 154–172 on one of the pole pieces 82 or 84.

Although one or more of the ribs 124–137 on one side 123 or 125 of the blade 26 engages one of the pole pieces 82 or 84, the large majority of the one side 123 or 125 of the blade 26 is spaced from the engaged pole piece 82 or 84. Since the ribs 124–132 on the blade 26 are primarily formed of nonmagnetizable material, a rib on the blade is not magnetically attracted to a coil which is immediately adjacent to an engaged rib on a pole piece 82 or 84.

Any wear which occurs on the blade 26, due to engagement of the blade with the pole pieces 82 and 84, will be localized at the ribs 124–132 and will therefore be minimal. Almost none of the material forming the segments 88–94 of magnetizable material engages a pole piece 82 or 84. Therefore, what wear does occur will not tend to effect the magnetic interaction between the blade 26 and the magnetic fields provided by the coils 50, 52, 68 and 70. Even relatively extensive wear of one of the ribs 124–137 on the blade 26 will result in only very minimal changes in the operating characteristics of the rotary shock absorber 14.

Although both the blade 26 and pole pieces 82 and 84 have been provided with ribs and recesses, it is contemplated that the ribs and recesses could be provided in only the blade 26 or only the pole pieces 82 and 84. If desired, the ribs and recesses formed in the pole pieces 82 and 84 could be formed in members which are separate from the pole pieces.

Figure 5:
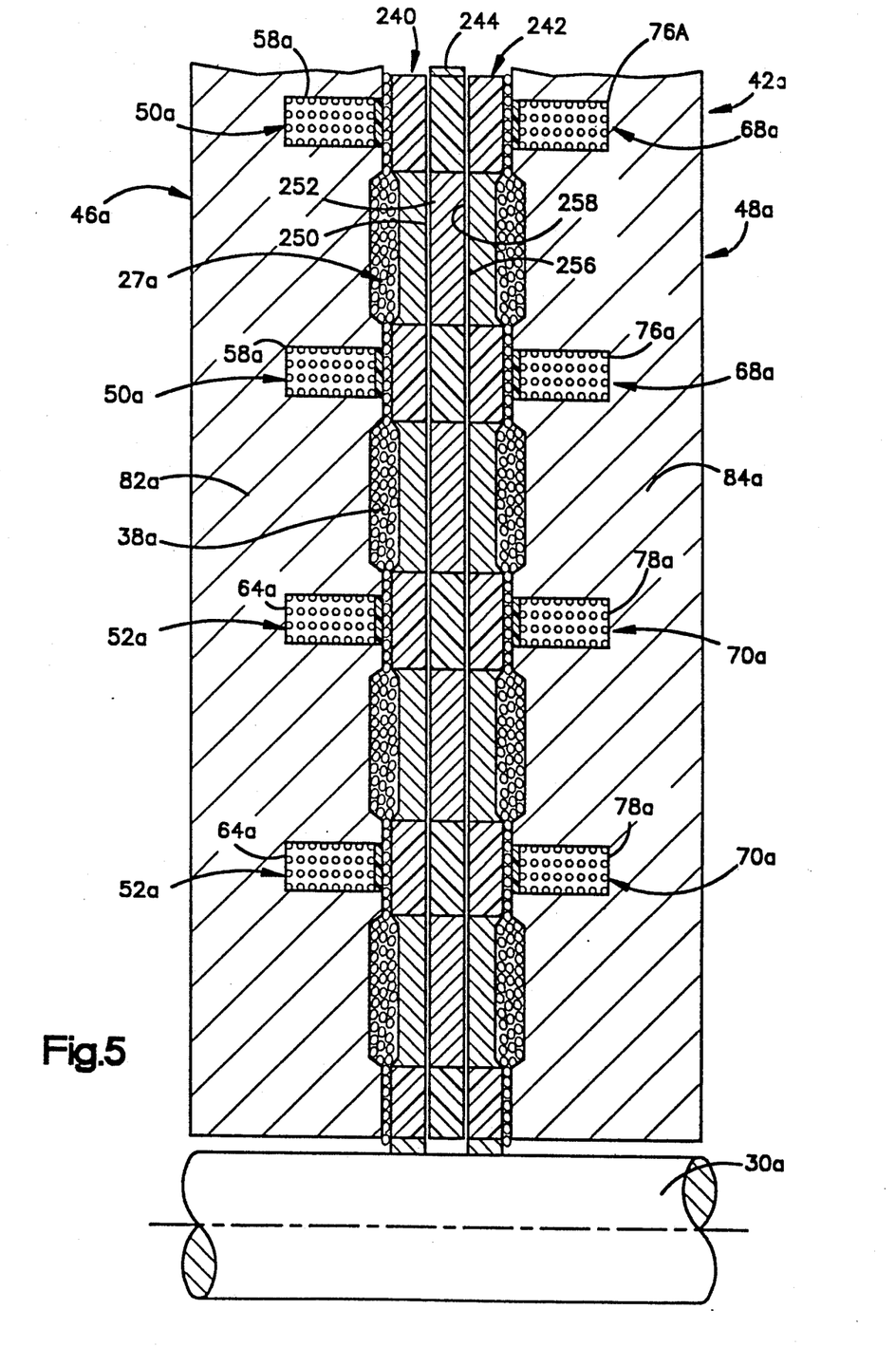
FIG. 5 is a schematicized sectional view, generally similar to FIG. 3, of a second embodiment of the invention.

In the embodiment of the invention illustrated in FIGS. 1–4, a single blade 26 is provided between a pair of pole pieces 82 and 84. It is contemplated that a plurality of blades, having the same or different constructions, could be provided between either a pair of pole pieces or a plurality of pairs of pole pieces. In the embodiment of the invention illustrated in FIG. 5, a pair of blades are disposed between a pair of pole pieces. Since the embodiment of the invention illustrated in FIG. 5 is generally similar to the embodiment of the invention illustrated in FIGS. 1–4, similar numerals will be utilized to designate similar components, the suffix letter "a" being associated with the numerals designating components of the embodiment of the invention illustrated in FIG. 5 in order to avoid confusion.

An electromagnet assembly 42a includes electromagnet sections 46a and 48a. Coils 50a, 52a, 68a and 70a are mounted in chambers 58a, 64a, 76a and 78a formed in pole pieces 82a and 84a. The pole pieces 82a and 84a have the same construction as the pole pieces 82 and 84 of FIGS. 1–4.

A pair of blades 240 and 242 are mounted between the pole pieces 82a and 84a in a chamber 27a filled with fluid 38a. The blades 240 and 242 are fixedly secured to a shaft 30a for rotation therewith. A dead blade or panel 244 is disposed between the blades 240 and 242. The dead blade 244 is stationary relative to the pole pieces 82a and 84a and does not rotate with the blades 240 and 242 and the shaft 30a.

The blades 240 and 242 differ from the blade 26 in that recesses are formed in only one side of the blades 240 and 242. The side of each blade opposite from the recesses is flat and devoid of recesses. The flat side of each of the blades 240 and 242 cooperates with flat side surfaces of the dead blade 244. Thus, the left (as viewed in FIG. 5) side of the blade 240 has recesses and ribs with the same configuration and construction as the recesses 108, 110, 112 and 114 and ribs 124, 126, 128 and 130 of the blade 26 (FIG. 3). The right (as viewed in FIG. 5) side surface 250 of the blade 240 is flat. The flat side surface 250 of the blade 240 is disposed adjacent to a flat side surface 252 formed on the dead blade 244.

The blade 242 has the same general construction as the blade 240. However, recesses are formed in the right side (as viewed in FIG. 5) of the blade 242. Thus, the right (as viewed in FIG. 5) side of the blade 242 has recesses corresponding to the recesses 116, 118, 120 and 122 in the blade 26 of FIG. 3). The left or opposite side 256 of the blade 242 is flat and cooperates with a flat side 258 of the dead blade 244.

If desired, both sides of the blades 240 and 242 could be formed with projections and recesses. If this was done, the blades 240 and 242 would have the same construction as the blade 26 of FIG. 3. If both sides of the blades 240 and 242 were formed with recesses, as shown for the blade 26 in FIG. 3, the dead blade or panel 244 would still have flat side surfaces 252 and 258. However, if desired, the dead blade or panel 244 could be formed with recesses and ribs which have the same cross sectional configuration as the ribs and recesses formed in the blade 26.

It should be understood that the dead blade or panel 244 extends completely across the chamber 27a. Thus, the dead blade or panel divides the chamber 27a into two subchambers, the blade 240 being in one of the subchambers and the blade 242 being in the other subchamber.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for damping movement between relatively movable parts, said apparatus comprising:

a housing connectable with a first one of the parts and at least partially defining a chamber for holding magnetic field responsive fluid;

a blade disposed in the chamber in said housing and connectable with a second one of the relatively movable parts, said blade having a plurality of segments formed of magnetizable material separated by segments formed of a nonmagnetizable material;

magnetic field responsive fluid in said chamber; electromagnetic coil means connected with said housing for applying a magnetic field to the fluid in the chamber to vary the shear strength of the fluid and thereby vary the resistance to relative movement between said blade and housing; and surface means defined by at least one of said blade and housing for defining a plurality of recesses which hold magnetic field responsive fluid and for defining a plurality of projections separating the recesses, the recesses being segments of the blade formed of magnetizable material and the projections being segments of the blade formed of nonmagnetizable material so that lateral deflection of said blade relative to said housing results in engagement of the segments of said blade formed of nonmagnetizable material with a surface connected with said housing while maintaining at least major portions of segments of said blade formed of the magnetizable material spaced from the surface connected with said housing.

2. An apparatus as set forth in claim 1 wherein said blade has a first major side which is disposed adjacent to said surface connected with said housing, said plurality of recesses including a first series of recesses formed in said first major side of said blade and a second series of recesses formed in said surface connected with said housing, said plurality of projections including a first series of projections formed in said first major side of said blade and disposed between recesses of said first series of recesses and a second series of projections formed in said surface connected with said housing and disposed between recesses of said second series of recesses.

3. An apparatus as set forth in claim 2 wherein said blade has a second major side which is opposite from said first major side and is disposed adjacent to a second surface connected with said housing, said plurality of recesses including a third series of recesses formed in said second major side of said blade and a fourth series of recesses formed in said second surface connected with said housing, said plurality of projections including a third series of projections formed in said second major side of said blade between recesses of said third series of recesses and a fourth series of projections formed in said second surface connected with said housing and disposed between recesses of said fourth series of recesses.

4. An apparatus as set forth in claim 2 wherein said blade has a second major side which is opposite from said first major side and is flat.

5. An apparatus as set forth in claim 1 wherein said blade has a first edge portion which is leading and a second edge portion which is trailing during movement of said blade in a first direction, said blade having first and second major sides which extend between said first and second edge portions of said blade, said plurality of recesses including a first series of recesses formed in said first major side of said blade, each recess of said first series of recesses having a first open end portion disposed in said first edge portion of said blade and a second open end portion disposed in said second edge portion of said blade, said plurality of projections including a first series of projections formed in said first major side of said blade between recesses of said first series of recesses, each of said projections of said first series of projections having a first end portion disposed in said first edge portion of said blade and a second end portion disposed in said second edge portion of said blade.

6. An apparatus as set forth in claim 5 wherein said plurality of recesses includes a second series of recesses formed in said second major side of said blade, each recess of said second series of recesses having a first open end portion disposed in said first edge portion of said blade and a second open end portion disposed in said second edge portion of said blade, said plurality of projections including a second series of projections formed in said second major side of said blade between recesses of said second series of recesses, each of said projections of said second series of projections having a first end portion disposed in said first edge portion of said blade and a second end portion disposed in said second edge portion of said blade.

7. An apparatus as set forth in claim 5 wherein said second major side of said blade is flat.

8. An apparatus as set forth in claim 5 wherein each of said recesses of said first series of recesses has a depth of between 0.005 inches and 0.050 inches.

9. A blade which is movable in a chamber of a housing having an electromagnetic coil for applying a magnetic field to magnetic field responsive fluid in the chamber, said blade comprising a plurality of segments formed of magnetizable material separated by a plurality of segments of nonmagnetizable material, characterized by said blade having a plurality of recesses separated by a plurality of projections with the plurality of recesses being at least partially formed in said segments of the magnetizable material and the plurality of projections being at least partially formed by the segments of nonmagnetizable material, said blade having a first edge portion which is leading and a second edge portion which is trailing during movement of said blade in a first direction in the chamber formed in the housing, each of said recesses having an open end portion disposed in said first edge portion of said blade and an open end portion disposed in said second edge portion of said blade, each of said projections extending between said first and second edge portions of said blade to separate said recesses throughout the length of said recesses.

10. A blade as set forth in claim 9 wherein each of said recesses has a depth of between 0.005 inches and 0.050 inches.

11. An apparatus for damping movement between relatively movable parts, said apparatus comprising:
  a housing connectable with a first one of the relatively movable parts and at least partially defining a chamber;
  a blade disposed in the chamber in said housing and connectable with a second one of the relatively movable parts, said blade and said housing moving relatively upon relative movement of the parts;
  said blade including an end portion having a pivot axis about which said blade is pivotable in opposite directions, said blade having first and second edge portions extending substantially parallel with each other away from said end portion, said first and second edge portions extending transverse to said pivot axis about which said blade pivots;
  said blade having a first pair of major surfaces extending transverse to said pivot axis about which said blade pivots, said first pair of major surfaces extending parallel to a second pair of surfaces on said housing;
  magnetic field responsive fluid in said chamber;
  electromagnetic coil means for applying a magnetic field to the magnetic field responsive fluid in the chamber to vary the shear strength of the fluid in the chamber and thereby vary the resistance to relative movement between said blade and said housing; and
  surface means on at least one of said first and second pairs of surfaces for defining a plurality of recesses which hold magnetic field responsive fluid and for defining a plurality of projections separating the recesses.

12. An apparatus as set forth in claim 11 wherein said plurality of recesses includes a first series of recesses formed in said housing and opening toward said blade and a second series of recesses formed in said blade and opening toward said first series of recesses formed in said housing.

13. An apparatus as set forth in claim 11 wherein said plurality of recesses includes a first series of recesses formed in one of said first pair of major surfaces of said blade and a second series of recesses formed in the other one of said first pair of major surfaces of said blade.

14. An apparatus as set forth in claim 11 wherein said plurality of recesses is at least partially formed in one of said first pair of major surfaces of said blade, the other one of said first pair of major surfaces of said blade being flat and devoid of recesses.

15. An apparatus as set forth in claim 11 wherein each of said recesses has a depth of between 0.005 inches and 0.050 inches.

16. An apparatus as set forth in claim 11 wherein said plurality of projections include a first series of projections connected with said housing and facing toward said blade and a second series of projections connected with said blade and facing toward said first series of projections connected with said housing.

17. An apparatus as set forth in claim 11 wherein said plurality of projections includes a first series of projections connected with one of said first pair of major surfaces of said blade and a second series of projections connected with the other one of said first pair of major surfaces of said blade.

18. An apparatus as set forth in claim 11 wherein said plurality of projections is at least partially connected with one of said first pair of major surfaces of said blade, the other one of said first pair of major surfaces of said blade being flat and devoid of projections.

19. An apparatus as set forth in claim 11 wherein said first edge portion of said blade leads said second edge portion when said blade pivots about said pivot axis in one direction and trails said second edge portion when said blade pivots about said pivot axis in the opposite direction.

* * * * *